United States Patent

Ohashi et al.

[11] Patent Number: 5,828,533
[45] Date of Patent: Oct. 27, 1998

[54] THIN FILM MAGNETIC HEAD WITH DIFFERING SATURATION MAGNETIC FLUX DENSITY FILMS AND SPACER BETWEEN FLOATING SURFACE AND COIL PATTERNS

[75] Inventors: Keishi Ohashi; Haruo Urai; Shinsaku Saito, all of Tokyo, Japan

[73] Assignee: NEC Corporation, Tokyo, Japan

[21] Appl. No.: 659,565

[22] Filed: Jun. 10, 1996

[30] Foreign Application Priority Data

Jun. 14, 1995 [JP] Japan ................................ 7-147548

[51] Int. Cl.⁶ ........................ G11B 5/147; G11B 5/235
[52] U.S. Cl. ........................................ 360/126; 360/120
[58] Field of Search ................................. 360/126, 119, 360/120, 122, 125

[56] References Cited

U.S. PATENT DOCUMENTS

| | | | |
|---|---|---|---|
| 4,782,416 | 11/1988 | Hillenbrand et al. | 360/126 |
| 5,126,907 | 6/1992 | Hamakawa et al. | 360/126 |
| 5,224,002 | 6/1993 | Nakashima et al. | 360/126 |
| 5,245,493 | 9/1993 | Kawabe et al. | 360/126 |
| 5,590,008 | 12/1996 | Tanabe et al. | 360/126 |
| 5,652,687 | 7/1997 | Chen et al. | 360/126 |

FOREIGN PATENT DOCUMENTS 03-029104  2/1991  Japan.
03-144907  6/1991  Japan.

*Primary Examiner*—Craig A. Renner
*Attorney, Agent, or Firm*—Young & Thompson

[57] ABSTRACT

A thin film magnetic head includes lower and upper magnetic cores, an upper magnetic core distal end portion, a magnetic gap layer, coil layers, and insulating layers. The lower magnetic core has a distal end portion facing a magnetic head floating surface. The upper magnetic core distal end portion opposes the distal end portion of the lower magnetic core through a magnetic gap. The lower magnetic core and the upper magnetic head distal end portion are heated at a temperature T1 to have a saturation magnetic flux density BS1. The upper magnetic core magnetically connects the lower magnetic core and the upper magnetic core distal end portion to constitute a magnetic core and is heated at a temperature T2 to have a saturation magnetic flux density BS2. Note that T2<T1 and BS2<BS1. The nonmagnetic layer is formed between the lower and upper magnetic cores to constitute the magnetic gap. The coil layers are formed between the upper magnetic core and the nonmagnetic layer to excite the lower and upper magnetic cores. The insulating layers insulate the coil layers from each other and the coil layers and the upper magnetic core from each other. A method of manufacturing a thin film magnetic head, and a magnetic recording apparatus are also disclosed.

15 Claims, 5 Drawing Sheets

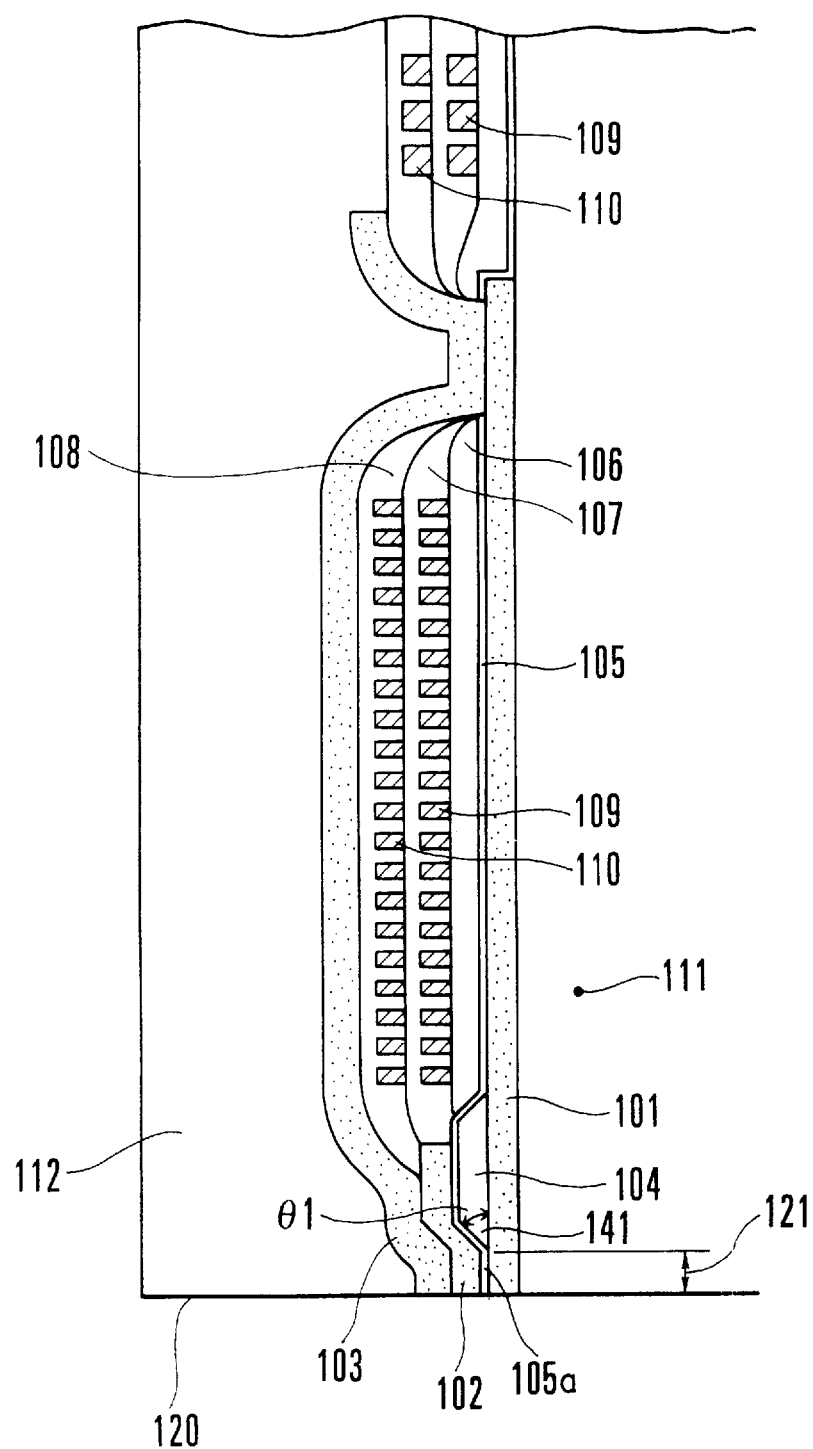
F I G. 1

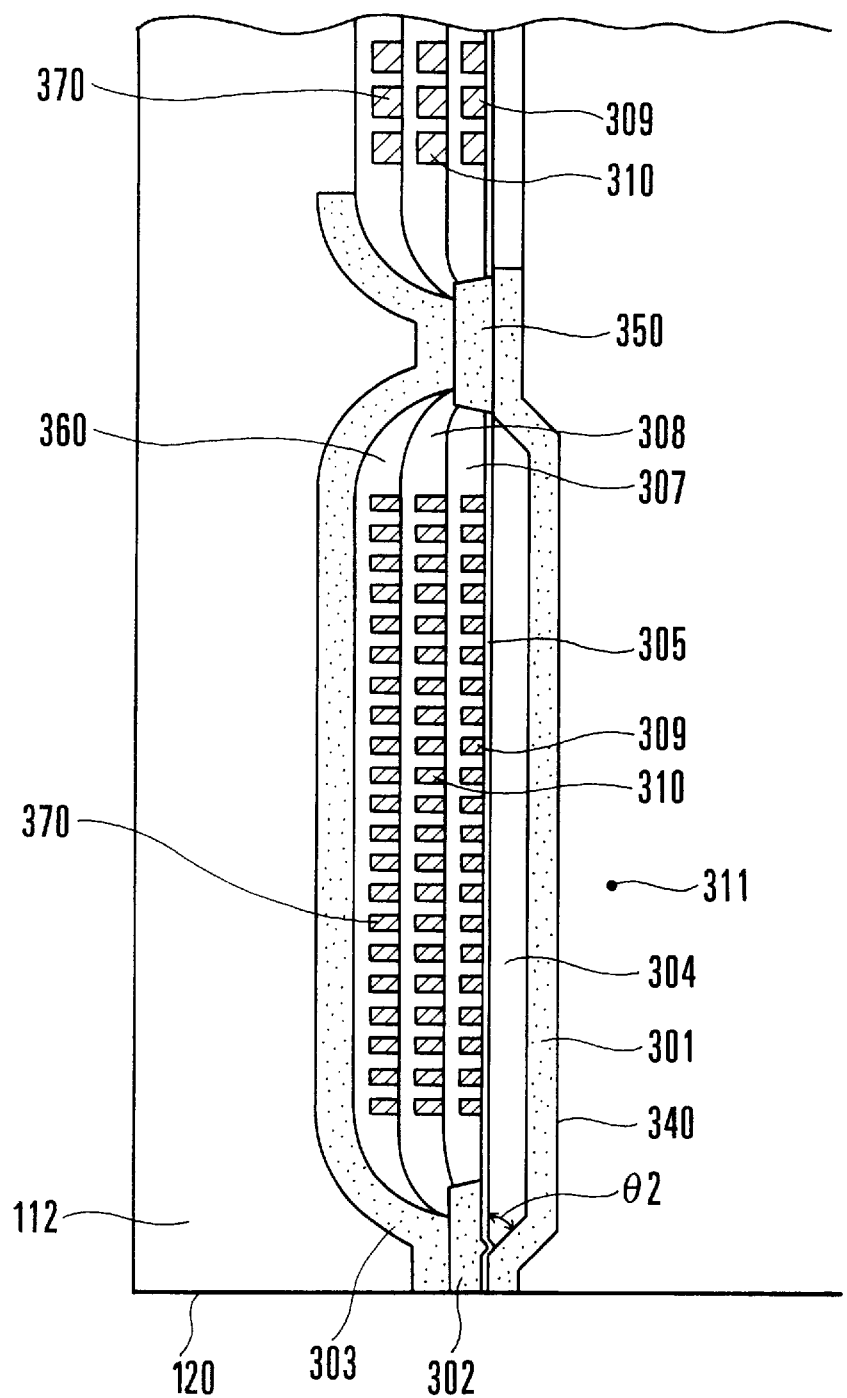
F I G. 3

THIN FILM MAGNETIC HEAD WITH DIFFERING SATURATION MAGNETIC FLUX DENSITY FILMS AND SPACER BETWEEN FLOATING SURFACE AND COIL PATTERNS

BACKGROUND OF THE INVENTION

The present invention relates to a thin film magnetic head, a method of manufacturing the same, and a magnetic storing apparatus using this thin film magnetic head and, more particularly, to a thin film magnetic head used in a magnetic storing apparatus for a computer and a method of manufacturing the same.

Conventionally, a thin film magnetic head of this type often uses a permalloy film manufactured mainly by electroplating as a magnetic core material. In order to allow a magnetic head to write information on a magnetic recording medium having a high coercive force on which higher-density recording can be performed, a magnetic core material having a higher magnetic flux density than the saturation magnetic flux density (0.8 to 1.0 T) of permalloy must be employed.

The magnetization transition length of a magnetic recording medium, which is one of the factors that determine the upper limit of the magnetic recording density, depends on the magnetic field and the magnetic field gradient generated when the recording point of the magnetic recording medium moves away from the gap of the magnetic head. Accordingly, to increase the recording density of a core material is to make at least the distal end portion of an upper magnetic core (on the rear end side of the magnetic head) to have a high saturation magnetic flux density.

FIG. 5 shows an example of a conventional thin film magnetic head employing a magnetic film having a high saturation magnetic flux density.

Referring to FIG. 5, this conventional thin film magnetic head has a lower magnetic core 31 made of a permalloy film in contact with an aluminum oxide underlying layer 11, and a distal end portion 32 of the lower magnetic core 31 which is made of a magnetic film having a higher saturation magnetic flux density than that of permalloy. A nonmagnetic layer 5 and conductive coil layers 9 and 10 serving as nonmagnetic bodies are arranged on the lower magnetic core 31 and the distal end portion 32. The nonmagnetic layer 5 forms a magnetic gap 5a of about 0.1 μm to 1.0 μm between a distal end portion 33 of an upper magnetic core 34 and the distal end portion 32 to generate a recording magnetic field during writing and to introduce a signal magnetic flux from the medium to the magnetic core during reading.

The conductive coil layers 9 and 10 are formed by known pattern plating and use Cu as the material. Insulating layers 6, 7, and 8 are polymeric films each formed with a baked photoresist pattern. The conductive coil layers 9 and 10 are surrounded by the insulating layers 6, 7, and 8. The distal end portion 33 and the upper magnetic core 34 made of magnetic films having a high saturation magnetic flux density are arranged on the insulating layer 8 to form a magnetic circuit together with the lower magnetic core 31 and the distal end portion 32 so as to interlink with the conductive coil layers 9 and 10. The thin film magnetic head element formed in this manner is covered with an aluminum oxide protection film 12.

As an invention concerning a thin film magnetic head which uses a magnetic film having a high saturation magnetic flux density as part of the core in accordance with the above arrangement, for example, Japanese Patent Laid-Open No. 3-144907 discloses a technique in which a soft magnetic film having a higher saturation magnetic flux density than that of the back core portion of an NiFe film is used in a magnetic core layer facing the magnetic recording medium side of the magnetic gap. According to this technique, the soft magnetic film having a high saturation magnetic flux density is formed of a ternary alloy of Fe—Co—Ni or a quaternary alloy of Fe—Co—Ni—Cr by electroplating.

According to another example, Japanese Patent Laid-Open No. 3-29104 discloses a technique in which two-layered laminated film formed of an amorphous alloy or a multilayered magnetic alloy is used in an upper or lower magnetic pole, and only a material having a high saturation magnetic flux density is exposed on a surface facing the magnetic recording medium.

In these conventional thin film magnetic heads, a polymeric film, e.g., a baked photoresist, is used as the insulating layer. Therefore, in order to prevent thermal decomposition of the polymeric film, magnetic materials and manufacturing methods that can be employed to form the distal end portion of the upper magnetic core are limited.

Although a photoresist crosslinked by baking forms an excellent insulating film, it is thermally decomposed largely at 300° C. or more. Therefore, it is difficult to heat an upper magnetic core formed after formation of the insulating film at a temperature of 300° C. or more. When an appropriate polyimide polymeric film is used in place of a photoresist, although the thermal decomposition temperature is increased, the polyimide polymeric film is thermally decomposed at 400° C. or more.

In order to avoid such thermal decomposition, an inorganic material, e.g., aluminum oxide ($Al_2O_3$) may be used as the insulating layer material in place of the baked photoresist. In this case, however, an inorganic material having a thickness of several μm to 20 and several μm must be patterned, making the manufacture difficult when compared to a case when a baked photoresist is used.

Most of soft magnetic materials can obtain excellent soft magnetic characteristics only after they are heated appropriately. For example, in a film made of an iron-based microcrystalline material, e.g., Fe—Ta—N or Fe—Ta—C, in order to bring out the excellent soft magnetic characteristics of a saturation magnetic flux density of 1.5 to 1.8 T and a permittivity of 3,000 to 6,000, the film must be heated at a temperature of 400° C. or more. A conventional thin film magnetic head having a polymeric insulating layer, however, cannot be heat-treated at a temperature of 400° C. or more, even if such a soft magnetic film is used as the magnetic core material, excellent soft magnetic characteristics cannot be sufficiently brought out.

SUMMARY OF THE INVENTION

It is an object of the present invention to provide a thin film magnetic head having excellent soft magnetic characteristics, a method of manufacturing the same, and a magnetic storing apparatus using this thin film magnetic head.

It is another object of the present invention to provide a thin film magnetic head whose magnetic core can be heated at a higher temperature than the thermal decomposition temperature of an insulating film, a method of manufacturing the same, and a magnetic storing apparatus using this thin film magnetic head.

In order to achieve the above objects, according to the present invention, there is provided a thin film magnetic head comprising a first magnetic film having a distal end portion facing a magnetic head floating surface, the first magnetic film being heated at a temperature T1 to have a saturation magnetic flux density BS1, a second magnetic film opposing the distal end portion of the first magnetic film through a magnetic gap, the second magnetic film being heated at the temperature T1 to have the saturation magnetic flux density BS1, a third magnetic film that magnetically connects the first and second magnetic films to constitute a magnetic core, the third magnetic film being heated at a temperature T2 to have a saturation magnetic flux density BS2, the temperatures T2 and T1 satisfying an inequality T2<T1, and the saturation magnetic flux densities BS1 and BS2 satisfying an inequality BS2<BS1, a nonmagnetic layer formed between the first and third magnetic films to constitute the magnetic gap, thin film coil patterns formed between the third magnetic film and the nonmagnetic layer to excite the first and third magnetic films, and insulating layers for insulating the thin film coil patterns from each other and the thin film coil patterns and the third magnetic film from each other.

BRIEF DESCRIPTION OF THE DRAWINGS

FIG. 1 is a sectional view showing a thin film magnetic head according to the first embodiment of the present invention;

FIG. 3 is a sectional view showing a thin film magnetic head according to the third embodiment of the present invention;

DESCRIPTION OF THE PREFERRED EMBODIMENTS

Figure 2:
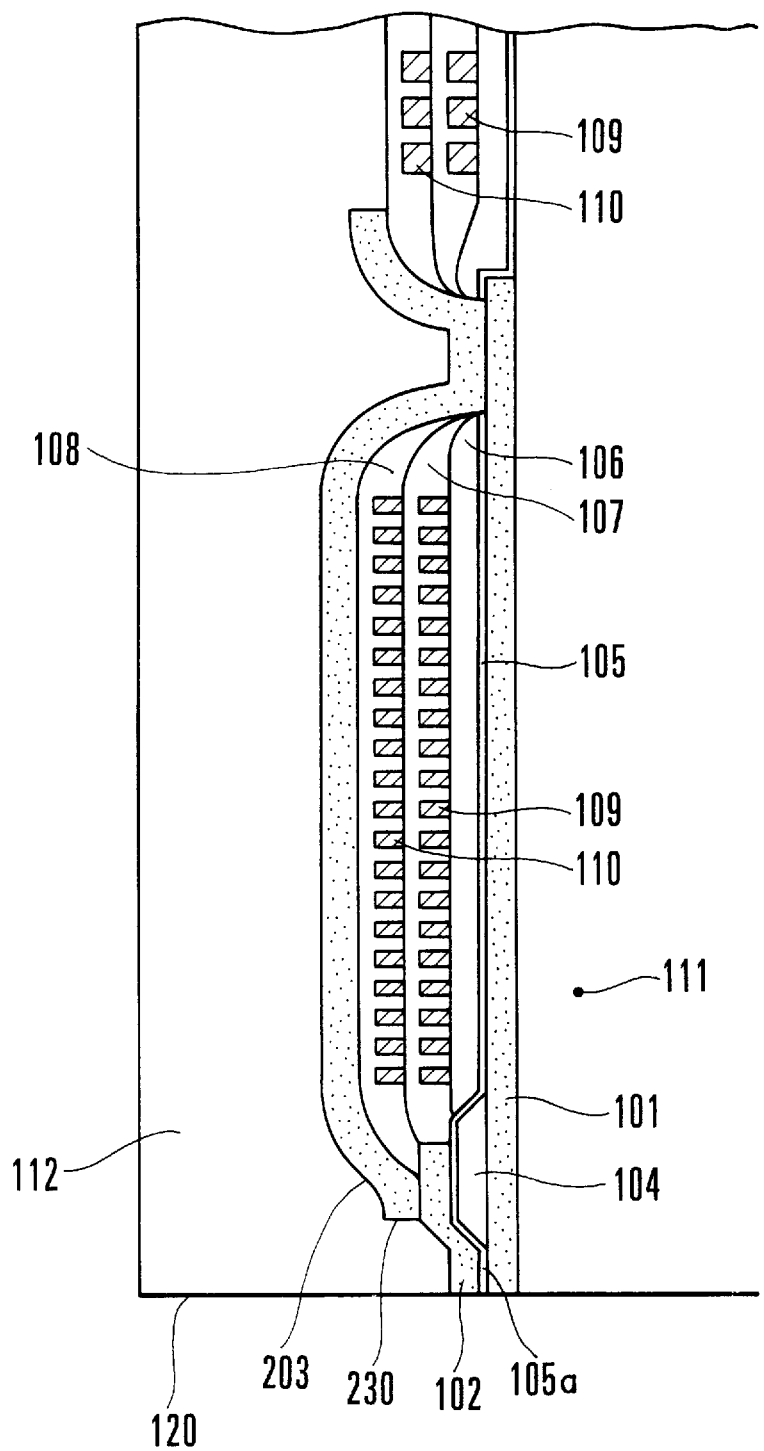
FIG. 2 is a sectional view showing a thin film magnetic head according to the second embodiment of the present invention.

The present invention will be described with reference to the accompanying drawings.

FIG. 1 shows the first embodiment of the present invention. Referring to FIG. 1, in the first embodiment, a lower magnetic core 101 is formed in contact with an aluminum oxide underlying layer 111. The lower magnetic core 101 is made of an Fe—Ta—N film heated at a temperature of 400° to 600° C. after formation and has a high saturation magnetic flux density. The lower magnetic core 101 has a thickness of 2 to 4 $\mu$m. A nonmagnetic layer 105 having a thickness of 1 $\mu$m or less is formed in contact with the lower magnetic core 101. A distal portion of the nonmagnetic layer 105 constitutes a magnetic gap 105a of a magnetic head. A nonmagnetic spacer 104 is formed between the lower magnetic core 101 and the nonmagnetic layer 105.

The nonmagnetic spacer 104 is separated from a magnetic head floating surface 120 by a distance corresponding to the length of a throat length 121 and extends along the surface of lower magnetic core 101 a length of about 5 to 25 $\mu$m. As the nonmagnetic spacer 104, an aluminum oxide film formed by sputtering is used. The nonmagnetic spacer 104 has a thickness of 1 to 4 $\mu$m to increase the distance between the lower magnetic core 101 and a distal end portion 102 of an upper magnetic core 103. The nonmagnetic spacer 104 decreases magnetic flux leakage between the lower magnetic core 101 and the distal end portion 102, thereby increasing the magnetic flux efficiency.

An end portion 141 of the nonmagnetic spacer 104 is tapered so that the distal end portion 102 will not form a sharp step to degrade the magnetic characteristics. This taper angle $\theta_1$ is preferably 60° or less, and more preferably 45° or less.

The distal end portion 102 extends from the magnetic head floating surface 120 onto the nonmagnetic spacer 104 in an overlapping manner through the throat length 121 portion. The distal end portion 102 is formed by patterning an Fe—Ta—N film heated at 400° to 600° C. after formation to have a high magnetic flux density. The distal end portion 102 has a thickness of 2 to 4 $\mu$m.

The Fe—Ta—N film used for forming the lower magnetic core 101 and the Fe—Ta—N film used for forming the distal end portion 102 may be heat-treated simultaneously but must be heat-treated before formation of polymeric insulating layers 106, 107, and 108. This is based on the following reason. The insulating layers 106, 107, and 108 use, as an insulating layer material, a photoresist pattern which is crosslinked by baking at 200° to 300° C. This insulating layer material is thermally decomposed in a heat treatment at 300° C. or more.

Accordingly, when forming coil layers 109 and 110, the nonmagnetic layer 105 is formed on the lower magnetic core 101, and the distal end portion 102 is formed on a region corresponding to the distal end portion of the lower magnetic core 101. Subsequently, the patterns of the coil layers 109 and 110 are laminated on a portion of the nonmagnetic layer 105 excluding the distal end portion 102 through the interlayer insulating layers 106, 107, and 108 made of the polymeric material.

Subsequently, the upper magnetic core 103 is formed in contact with the distal end portion 102 and the uppermost insulating layer 108. The upper magnetic core 103 magnetically connected to the distal end portion 102 is a permalloy film pattern formed by a known pattern plating technique. This permalloy film pattern exhibits a sufficiently stable high magnetic permeability (permittivity>2,000) when heated in a magnetic field at 300° C. or less. The upper magnetic core 103 has a thickness of 3 to 6 $\mu$m, which is slightly larger than that of the distal end portion 102. A protective film 112 may also be provided.

The permalloy film has a lower saturation magnetic flux density (0.8 to 1.0 T) than that of the Fe—Ta—N film. However, when the thickness of the permalloy film is increased, magnetic saturation in the upper magnetic core 103 can be avoided. In order to eliminate leakage of the signal magnetic flux at the connecting portion of the distal end portion 102 and upper magnetic core 103, the length of the connecting portion must be larger than the thickness of the distal end portion 102 or upper magnetic core 103. In other words, the contact area between the distal end portion 102 and the upper magnetic core 103 at the connecting portion must be set larger than the minimum area of a section perpendicular to a direction in which the signal magnetic flux of the upper magnetic core distal end portion 102 flows.

Regarding the film material having a high saturation magnetic flux density which is used to form the lower magnetic core 101 and the upper magnetic core distal end portion 102, not only the Fe—Ta—N film but also an iron-based microcrystalline film, e.g., an Fe—Ta—C film or an Fe—Zr—N film, which exhibits excellent soft magnetic characteristics when heated at a temperature equal to or higher than the thermal decomposition temperature of the insulating films, can be used to obtain the same effect.

In general, in a multi-element alloy of X—Y—Z containing X={Fe, Co}, Y={Ta, Zr, Nb, Al}, and Z={N, C}, when a microcrystalline film material that exhibits excellent soft magnetic characteristics when heated is used, the same effect as that obtained when using the Fe—Ta—N film can be obtained. Note that each of X, Y, and Z represents at least one type of element in the corresponding braces { }.

The material of the lower magnetic core 101 and the distal end portion 102 is not limited to the iron-based microcrystalline material. It is obvious that if a material that can improve the soft magnetic characteristics when being heated at a temperature higher than the thermal decomposition temperature of the polymeric insulating film is used, the same effect as that described above can be obtained.

The material of the upper magnetic core 103 is not limited to the permalloy-plated film. The same effect can be obtained even by using a plating film other than the permalloy film, which can obtain excellent soft magnetic characteristics when being heated at a temperature lower than the thermal decomposition temperature of the polymeric insulating layer, or a Co-based amorphous film material formed by sputtering.

The second embodiment of the present invention will be described.

FIG. 2 shows the second embodiment of the present invention. The second embodiment has the same arrangement except for its upper magnetic core 203. In order to avoid a repetitive description, only the structure of the upper magnetic core 203 will be described, and a description of the remaining portions will be omitted.

Referring to FIG. 2, in the second embodiment, an end portion 230 of the upper magnetic core 203 formed of an Fe—Ta—N film is separated from a magnetic head floating surface 120 by about 5 to 15 $\mu$m. With this arrangement, since a permalloy film having a low saturation magnetic flux density is not exposed to the magnetic head floating surface 120, the magnetic field gradient during writing is sharper than that of the first embodiment. Accordingly, a thin film magnetic head which is more suitable for high-density recording can be obtained.

Also in this case, in order to eliminate leakage of the signal magnetic flux at the connecting portion of a distal end portion 102 of the upper magnetic core 203 and the upper magnetic core 203, the length of the connecting portion must be larger than the thickness of the distal end portion 102 or upper magnetic core 203.

The third embodiment of the present invention will be described.

FIG. 3 shows the third embodiment of the present invention. Referring to FIG. 3, in order to increase the output, the third embodiment has, in addition to coil layers 309 and 310 in insulating layers 307 and 308, respectively, a third coil layer 370 insulated by an insulating layer 360.

In the third embodiment, a recessed portion 340 having a depth of 1 to 4 $\mu$m is formed in an aluminum oxide underlying layer 311. A taper angle $\theta_2$ at the end portion of the recessed portion 340 is preferably 60° or less. As a lower magnetic core 301 is formed over the recessed portion 340, the core 301 itself has a recessed portion. When the taper angle $\theta_2$ becomes 60° or more, the soft magnetic characteristics of the lower magnetic core 301 are degraded largely.

A nonmagnetic spacer 304 is formed of an aluminum oxide film to bury the recessed portion of the lower magnetic core 301. In order to form the nonmagnetic spacer 304 that buries precisely only the recessed portion of the lower magnetic core 301, an aluminum oxide film having a thickness slightly larger than the depth of the recessed portion 340 is formed by sputtering, and the surface of this film is flattened. For this surface flattening, a known lapping (polishing) technique, an etch-back technique using a polymeric film, or the like is used, thereby substantially flattening the surface of a nonmagnetic layer 305.

In the third embodiment, when forming the Fe—Ta—N film at a distal end portion 302 of an upper magnetic core 303 by sputtering, a connecting portion 350 at the back gap portion of the lower magnetic core 301 and the upper magnetic core 303 is also formed of an Fe—Ta—N film by sputtering. This decreases the step of the upper magnetic core 303, thereby preventing degradation in magnetic characteristics caused by variations in composition of the upper magnetic core 303 in the pattern and the like.

As is apparent from this embodiment, the present invention can be applied regardless of the number of layers of the coils. In other words, the present invention can naturally be applied to a thin film magnetic head having four layers of coils or a thin film magnetic head having one coil layer.

Figure 4:
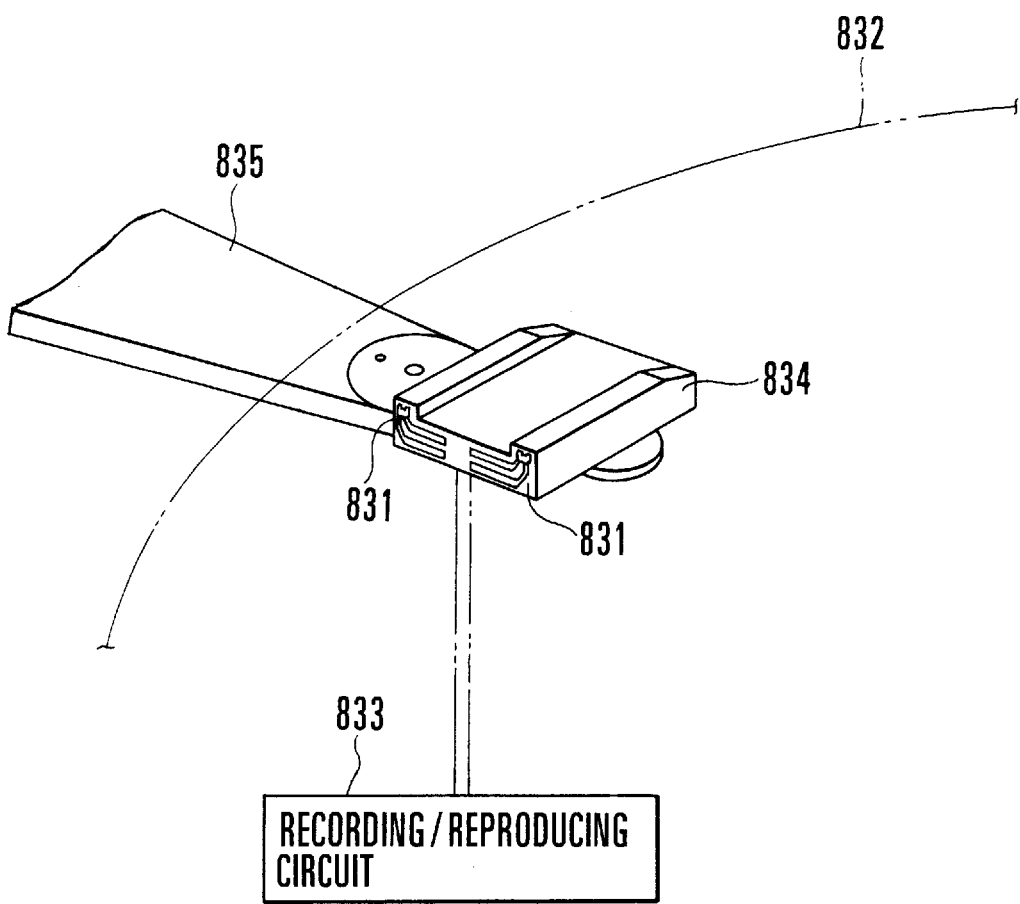
FIG. 4 shows the arrangement of a magnetic storing apparatus using the thin film magnetic head of the present invention.
Figure 5:
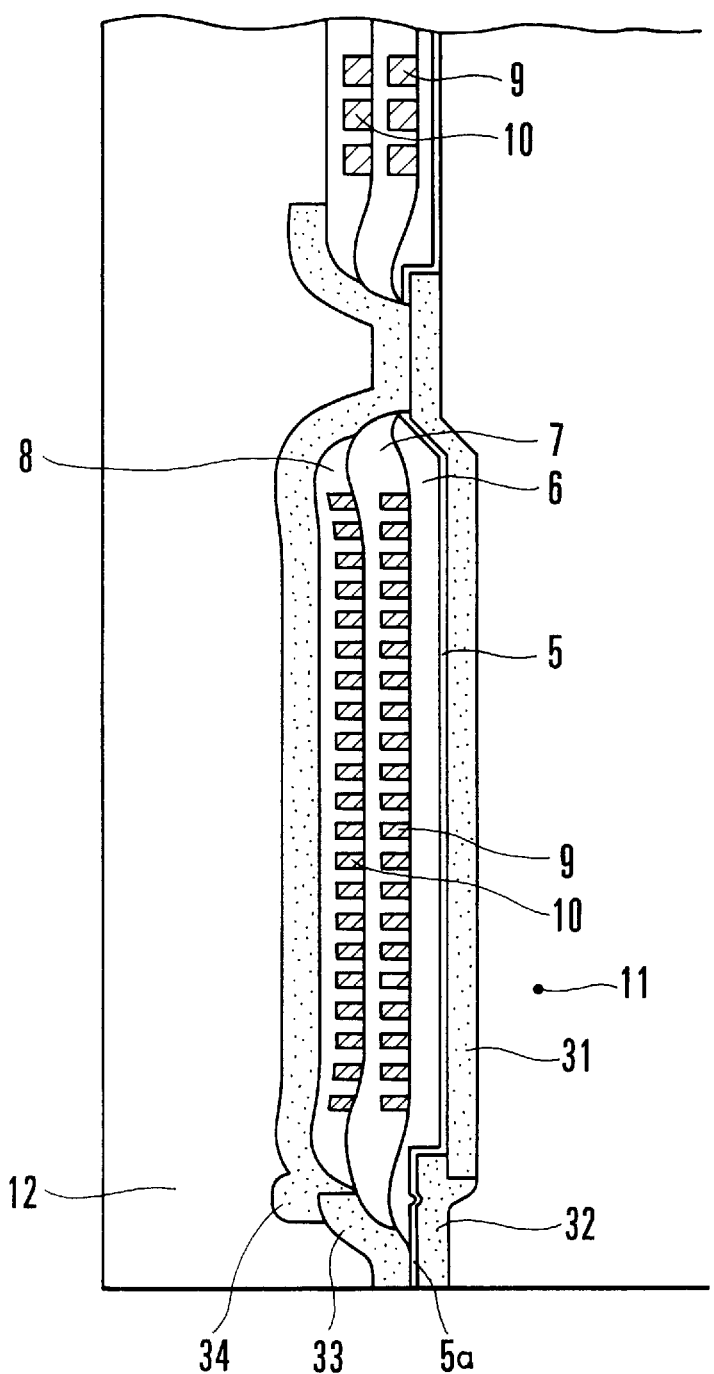
FIG. 5 is a sectional view showing a conventional thin film magnetic head.

The magnetic core of the thin film magnetic head provided by the structure and manufacturing method of each of the respective embodiments described above has a higher saturation magnetic flux density and a higher magnetic permeability than those of a magnetic core manufactured using only permalloy. Accordingly, as shown in FIG. 4, when such thin film magnetic heads 831 and a magnetic recording medium 832 having a high coercive force are combined, a magnetic storing apparatus having a high recording density can be realized. For example, a thin film magnetic head using an Fe—Ta—N film has a writing magnetic field intensity which is about 1.5 times that of a thin film magnetic head using only permalloy. Reference numeral 833 denotes a recording/reproducing circuit that controls recording/reproduction of information through the thin film magnetic heads 831 which move relative to the magnetic recording medium 832; 834, a slider having the thin film magnetic heads 831; and 835, a support spring for supporting the slider 834.

Thus, information can be written on a magnetic recording medium 832 having a large coercive force of 2,500 Oe while maintaining the floating gap of the thin film magnetic head 831 to 0.03 $\mu$m or more to assure a high reliability. Information can also be written on a magnetic recording medium 832 having a high coercive force of 2,200 Oe while maintaining the floating gap of thin film magnetic heads 831 to 0.07 $\mu$m or more. Furthermore, if the floating gap of the thin film magnetic heads 831 is further decreased to perform contact recording, information can be written also on a magnetic recording medium 832 having a coercive force of 2,800 Oe or more. Thus, a magnetic storing apparatus having high performance can be provided.

As has been described above, according to the present invention, a structure in which an upper magnetic core is located below a polymeric insulating layer in terms of layer arrangement and a method of manufacturing such a structure are provided. Hence, a soft magnetic film having a high saturation magnetic flux density can be heated at a higher temperature than the thermal decomposition temperature of the polymeric insulating layer before formation of the polymeric insulating layer, thereby providing a thin film magnetic head having a soft magnetic film and a polymeric insulating film both having excellent characteristics. Also, when this thin film magnetic head and a magnetic recording medium having a high coercive force are combined, a magnetic storing apparatus having a high recording density can be provided.

What is claimed is:

1. A thin film magnetic head comprising;
   a first magnetic film having a distal end portion facing a magnetic head floating surface, said first magnetic film being heated at a temperature T1 to have a saturation magnetic flux density BS1;
   a second magnetic film opposing only said distal end portion of said first magnetic film through a magnetic gap, said second magnetic film being heated at the temperature T1 to have the saturation magnetic flux density BS1;
   a third magnetic film that magnetically connects said first and second magnetic films to constitute a magnetic core, said third magnetic film being heated at a temperature T2 to have a saturation magnetic flux density BS2, T2 and T1 satisfying T2<T1, and BS1 and BS2 satisfying BS2<BS1;
   a nonmagnetic layer formed between said first and third magnetic films to constitute said magnetic gap;
   thin film coil patterns formed between said third magnetic film and said nonmagnetic layer to excite said first and third magnetic films;
   insulating layers for insulating said thin film coil patterns from each other and said thin film coil patterns and said third magnetic film from each other; and
   a nonmagnetic spacer made of an inorganic substance that is spaced from the magnetic head floating surface and that extends on said first magnetic film away from the magnetic head floating surface to a position short of said thin film coil patterns.

2. A head according to claim 1, wherein said second and third magnetic films are in contact with each other with a contact area which is larger than a minimum area of a section perpendicular to a direction in which a signal magnetic flux of said third magnetic film flows.

3. A head according to claim 1, wherein said third magnetic film has a distal end portion which is not exposed on said magnetic head floating surface.

4. A head according to claim 1, wherein said first and second magnetic films are made of a multi-element alloy containing X={Fe, Co}, Y={Ta, Zr, Nb, Al}, and Z={N, C}.

5. A head according to claim 1, wherein said third magnetic film is made of one of Ni—Fe, an Ni—Fe-based multi-element alloy, and a Cr-based amorphous alloy.

6. The head according to claim 1, wherein said thin film coil patterns and said insulating layers are formed directly between said third magnetic film and said nonmagnetic layer without intervention of said second magnetic film, except adjacent said distal end portion.

7. The head according to claim 1, wherein said second magnetic film comprises an iron-based microcrystalline film.

8. A head according to claim 1, wherein the temperature T1 for heating said first and second magnetic films is higher than a thermal decomposition temperature of said insulating layers.

9. A head according to claim 8, wherein said insulating layers are formed of polymeric films.

10. The head according to claim 1, wherein said nonmagnetic spacer has a trapezoid shape in vertical cross section, with a long surface on said first magnetic film.

11. The head according to claim 10, wherein said long surface of said nonmagnetic spacer is spaced from the magnetic head floating surface 5 to 25 μm, and said nonmagnetic spacer has a height of 1 to 4 μm.

12. A head according to claim 1, wherein said nonmagnetic spacer is provided between a portion of said first magnetic film, excluding said distal end portion thereof, and said nonmagnetic layer to prevent magnetic flux leakage between said first and second magnetic films.

13. A head according to claim 12, wherein said nonmagnetic spacer is provided between said portion of said first magnetic film excluding said distal end portion thereof facing said magnetic head floating surface and said second magnetic film.

14. A head according to claim 12, wherein said nonmagnetic spacer has a tapered surface inclined to a magnetic head floating surface side at an angle of not more than 60°, and one of said first and second magnetic films is bent along said tapered surface of said nonmagnetic spacer.

15. A head according to claim 12, wherein said nonmagnetic layer has a thickness of about 0.1 to 1 μm, and said nonmagnetic spacer has a thickness of 1 to 4 μm.

* * * * *